(No Model.)

N. KEELER.
POTATO DIGGER.

No. 341,919. Patented May 18, 1886.

Witnesses.
A. Ruppert.
Alfred T. Gage.

Inventor:
Noah Keeler,
Per
Thomas P. Simpson
Attorney

UNITED STATES PATENT OFFICE.

NOAH KEELER, OF WALLACE, NEW YORK.

POTATO-DIGGER.

SPECIFICATION forming part of Letters Patent No. 341,919, dated May 18, 1886.

Application filed August 14, 1885. Serial No. 174,421. (No model.)

*To all whom it may concern:*

Be it known that I, NOAH KEELER, a citizen of the United States, residing at Wallace, in the county of Steuben and State of New York, have invented certain new and useful Improvements in Potato-Diggers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The invention relates, generally, to diggers which first separate the potatoes from the vines and dirt, and then leave them in view of the "pickers-up."

The particular features of the invention will first be described in connection with the drawings, and then pointed out in the claims.

Figure 1:
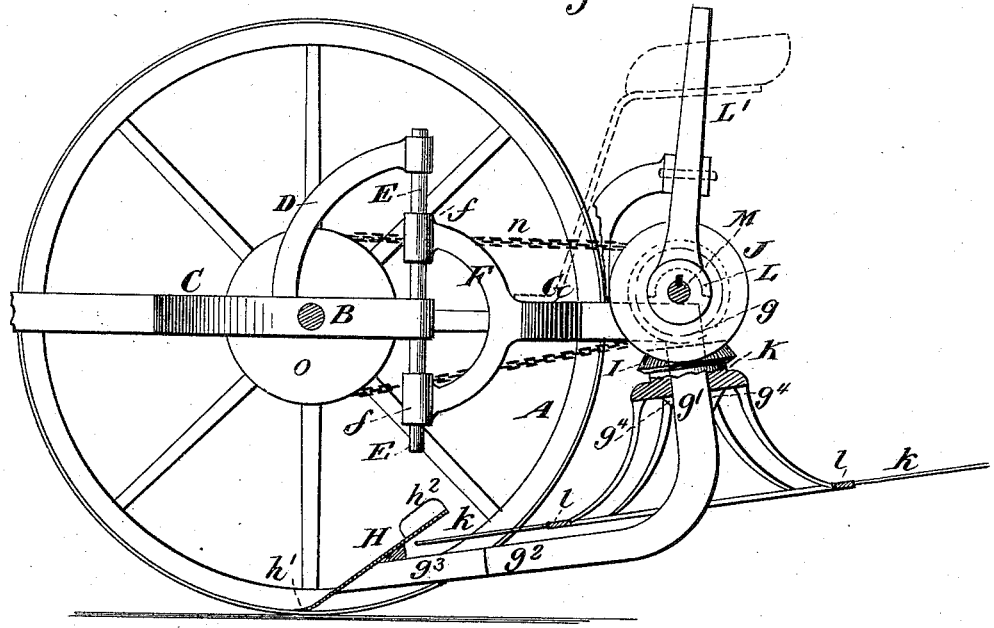
Figure 2:
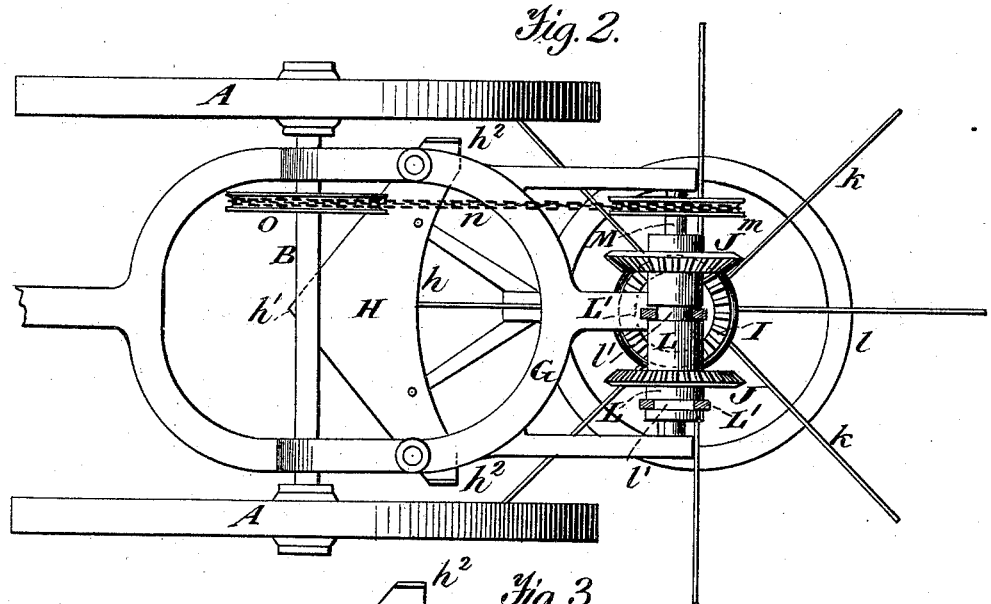
Figure 3:
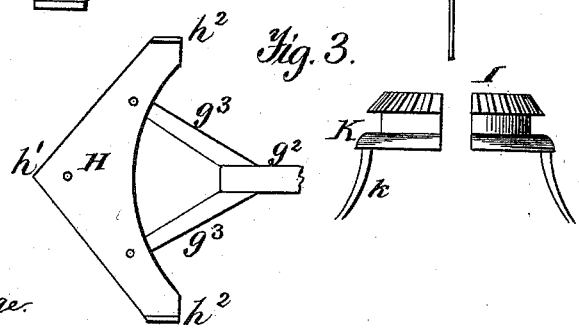

Figure 1 of the drawings is a side elevation, partly in section; Fig. 2, a top or plan view, and Fig. 3 detail views of the construction of special parts.

In the drawings, A represents the ground-wheels, B the axle, and C the frame, of my wheeled potato-digger. From the latter rise the brackets D D, having end tubes, through which pass and are held the pins E. These pins pass down through tubular guides $f$ of the bi-branched piece F, thus enabling the vehicle to play up and down without affecting the position of the plow. The piece F is connected with the upper end of the solid beam G, which is bent at $g$ to nearly a right angle, so as to form the arms $g'$ $g^2$. At the front end of the arm $g^2$ is secured the skeleton plow H on two branches, $g^3$ $g^3$, from the beam. This plow is cut out at $h$, turned up at the point $h'$, and upwardly flanged on each side, at $h^2$, so that the potatoes will be lifted, not allowed to escape laterally, and with the soil and vines be precipitated surely on the reel-arms $k$. At the upper end of the beam G is located a loose sleeve, K, which is supported on a beam-collar, $g^4$, and carries the peculiarly-shaped arms $k$, that revolve under the upper edge of the plow H. These arms form a reel for separating the potatoes from the dirt and vines. The reel is made in two pieces bolted together, in order that they may be readily applied to the vertical arm $g'$, to which they may be held by a detachably-fastened belt, band, or ring located on the neck between the rake-head and the bevel-wheel I. The upper part of the sleeve K carries a beveled spur-wheel, I, which gears with either of the correspondingly-beveled wheels, J J, that are fast on a sleeve, L, keyed to slide on and turn with the shaft M, journaled in bearings on the frame. At the turn of the arms $k$ to make a change in direction I place the ring $l$, so as to stop the vines and prevent them from working up farther on the reel-arms. On the shaft M is arranged a sprocket-wheel, $m$, which is connected by a chain, $n$, with a sprocket-wheel, $o$, on the axle. The sleeve L is provided with an annular groove, $l'$, in which works lever L', so as to gear either of the wheels J J with the wheel I, and thus revolve the reel in either direction, or so as to stand between the two wheels and connect with neither, so that the reel mechanism may be thrown out of gear with the drive mechanism in turning at the end of the potato-rows or in going to or from the field.

Having thus described all that is necessary to a full understanding of my invention, what I claim as new, and desire to protect by Letters Patent, is—

1. The combination, with the axle B, of the brackets D D, having end tubes, the pins E E, the piece F, having tubes $f$ $f$, and the beam G, which supports the digging mechanism, as and for the purpose specified.

2. The combination, with a lifting-plow, of a beam, G, having arms $g'$ $g^2$, arranged as shown, and a reel, $k$ $k$, having its arms brought vertically down and then run parallel with the plane of said beam until they pass under the rear end of the lift-plow, as shown and described.

3. A two-part reel having sleeve K, provided with bevel-wheel I, reel-head, and an intermediate neck, as shown, whereby it may be used in connection with a plow-beam and operative mechanism, as and for the purpose specified.

In testimony whereof I affix my signature in presence of two witnesses.

NOAH KEELER.

Witnesses:
C. B. STEPHENS,
F. S. LINE.